United States Patent
Ringger et al.

(10) Patent No.: US 10,248,645 B2
(45) Date of Patent: Apr. 2, 2019

(54) MEASURING PHRASE ASSOCIATION ON ONLINE SOCIAL NETWORKS

(71) Applicant: Facebook, Inc., Menlo Park, CA (US)

(72) Inventors: Eric Ringger, Seattle, WA (US); Hetunandan Munisharan Kamichetty, Seattle, WA (US); Rajat Raina, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 137 days.

(21) Appl. No.: 15/608,216

(22) Filed: May 30, 2017

(65) Prior Publication Data

US 2018/0349347 A1    Dec. 6, 2018

(51) Int. Cl.
  *G06F 17/30*    (2006.01)
  *G06F 17/27*    (2006.01)
  *G06Q 50/00*    (2012.01)
  *G06Q 30/02*    (2012.01)

(52) U.S. Cl.
  CPC ...... *G06F 17/2705* (2013.01); *G06F 17/3064* (2013.01); *G06F 17/3097* (2013.01); *G06Q 30/0251* (2013.01); *G06Q 30/0277* (2013.01); *G06Q 50/01* (2013.01)

(58) Field of Classification Search
  CPC .......... G06F 17/2705; G06F 17/3064; G06F 17/3097; G06Q 50/01; G06Q 30/0277; G06Q 30/0251
  USPC ........................................................ 707/736
  See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |

(Continued)

OTHER PUBLICATIONS

Massoudi, Kamran, et al., "Incorporating Query Expansion and Quality Indicators in Searching Microblog Posts", ECIR 2011, Dublin, Ireland, Apr. 18-21, 2011, pp. 362-367.*

(Continued)

*Primary Examiner* — Robert Stevens
(74) *Attorney, Agent, or Firm* — Baker Botts L.L.P.

(57) ABSTRACT

In one embodiment, a method includes retrieving multiple posts containing each of the query terms after receiving a search query for posts from a user of an online social network, identifying, from an index of known phrases, one or more known phrases in the text of the retrieved posts, filtering the retrieved posts to generate a filtered set of posts, wherein the filtering comprises removing each post not containing at least one of the identified known phrases, computing features for each of the identified known phrases, calculating a score for each post in the filtered set based on the features of the identified known phrases, ranking the posts based on the calculated scores, and sending instructions, to the client system, for generating a search-results interface comprising references to one or more of the posts presented in ranked order.

20 Claims, 8 Drawing Sheets

(56) References Cited

U.S. PATENT DOCUMENTS

| | | |
|---|---|---|
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,094 B2 * | 10/2013 | Luo ................... G06Q 10/10 707/748 |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,317,614 B2 * | 4/2016 | Stewart ............ G06F 17/30867 |
| 9,715,493 B2 * | 7/2017 | Papadopoullos ..... G06F 17/275 |
| 9,727,618 B2 * | 8/2017 | Sharp ................. G06F 17/3053 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0121840 A1 * | 5/2010 | Murdock .......... G06F 17/30687 707/722 |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209605 A1 * | 8/2012 | Hurvitz ............ G06F 17/30746 704/235 |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |

(56) References Cited

U.S. PATENT DOCUMENTS

| | | |
|---|---|---|
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0110498 A1* | 5/2013 | Bekkerman ......... G06F 17/2745 704/9 |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0039597 A1* | 2/2015 | Raina ...................... G06F 17/30 707/723 |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1* | 2/2016 | He ...................... G06F 17/3053 707/728 |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniayskii |

OTHER PUBLICATIONS

T. Tomokiyo and M. Hurst, "A Language Model Approach to Keyphrase Extraction," Proceedings of the ACL 2003 workshop on Multiword expressions: analysis, acquisition and treatment, vol. 18, pp. 33-40, Jul. 12, 2003.

C. Wang and J. Han, "Kert: Mining Representative in Short, Content-Representative Text," Mining Latent Entity Structures, Morgan and Claypool Publishers, (c) 2015, 7 pages, Feb. 1, 2015.

M. Sappelli, S. Verbeme, and W. Kraaij, "Recommending personalized touristic sights using Google Places," Proceedings of the 36th international ACM SIGIR conference on Research and development in information retrieval pp. 781-784, 2013, Aug. 1, 2013.

K. Y. Itakura and C. L. A. Clarke, "University of Waterloo at INEX 2009: Ad Hoc, Book, Entity Ranking, and Link-the-Wiki Tracks," Focused Retrieval and Evaluation: 8th International Workshop of the Initiative for the Evaluation of XML Retrieval, INEX 2009, Brisbane, Australia, Dec. 7-9, 2009, Revised and Selected Papers, pp. 331-341, Jul. 15, 2010.

D. Kelly, F. Diaz, N. J. Belkin, and J. Allan, "A User-Centered Approach to Evaluating Topic Models," Advances in Information Retrieval: 26th European Conference on IR Research, ECIR 2004, Sunderland, UK, Apr. 5-7, 2004, Proceedings, pp. 27-41, Mar. 1, 2004.

* cited by examiner

*term_position*: position of the found query term in the text

The newspaper reports that *Donald* Trump will hold a press conference.
510

FIG. 5A

*term_position - 0*

*term_position - 1*

The newspaper reports that *Donald* Trump will hold a press conference.
520
530

FIG. 5B

MEASURING PHRASE ASSOCIATION ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

Presenting posts that match the user's interest based on the given query term can be a challenging task for the social-networking system. In particular embodiments, the social-networking system may present search results about topics that are more closely associated with the phrases in a user's query by analyzing the phrases in the query and finding topics that have a better statistical likelihood to be equivalent to the topic intended by the querying user—in other words, finding topics with a better degree of equivalence to the phrase in the query. When a user queries with one or more query terms, the social-networking system may retrieve posts containing each of the one or more query terms in the text from the post verticals. For each retrieved post, the social-networking system may identify one or more phrases containing at least one of the one or more query terms, called candidate phrases. The social-networking system may determine whether each identified candidate phrase is listed in an index of known phrases. When a candidate phrase matches a phrase in the index of known phrases, the candidate phrase may be referred to as an identified known phrase. The social-networking system may filter out the posts that do not have any identified known phrases. Then, the social-networking system may rank the remaining posts based on the degree of equivalence between the query terms and the identified known phrases in each post. The degree of equivalence between the query terms and the identified known phrase can be measured by various features. The social-networking system may present posts having a relatively high rank to the user. As an example and not by way of limitation, Bob, a querying user, may search posts with a query term "Donald". The social-networking system may retrieve posts containing "Donald" in the text. The social-networking system may identify candidate phrases that contain "Donald" and the length of which are two words because the social-networking system may be configured that a pre-determined maximum length of known phrases is 2. The social-networking system may determine whether a candidate phrase is an identified known phrase by looking up the candidate phrase from an index of known phrases. If a candidate phrase matches in the index of known phrases, the phrase may be considered as an identified known phrase. The identified known phrases in this example may include, for example, "Donald Trump", "Donald Glover", and "Donald Duck". The social-networking system may filter out posts that do not have any identified known phrase in the text from the set of retrieved posts. The social-networking system may rank the remaining posts by calculating various features and applying a ranking model to the features. The social-networking system may present posts containing "Donald Trump" first to Bob as the posts containing "Donald Trump" are ranked higher than the other posts.

The social-networking system may receive a search query for posts of the online social network from a client system of a first user of an online social network. The search query may comprise one or more query terms. The social-networking system may retrieve a plurality of posts of the online social network, where each post contains each of the one or more query terms in a text of the post. The social-networking system may identify a plurality of candidate phrases comprising at least one of the one or more query terms and having a length less than or equal to the pre-determined maximum length in the text of each of the one or more retrieved posts. The social-networking system may identify one or more known phrases in the text of the one or more retrieved posts by determining whether each of the identified candidate phrases matches in an index of known phrases. Each phrase in the index of known phrases comprises a plurality of element terms, and each element term of a phrase having an association greater than a threshold with respect to each other element term of the phrase. The association may be measured by a Normalized Pointwise Mutual Information (NPMI) score with respect to terms extracted from a set of posts associated with the online social network posts created during a pre-determined period of time. The index of known phrases may be stored in a phrase table comprising a plurality of entries, where each entry in the phrase table comprises a phrase, element terms of the phrase, and their respective counts. In particular embodiments, the counts may be user counts, where each user count for an element is the number of unique users that mentioned the element in their posts. In particular embodiments, the counts may be post counts, where each post count for an element is the number of unique posts that contain the element. The social-networking system may filter the plurality of retrieved posts to generate a filtered set of posts, where the filtering comprises removing each post not containing at least one of the identified known phrases. The social-networking system may compute a plurality of features for each of the identified known phrases, where each feature measures a degree of equivalence between the identified known phrase and the one or more query terms included in the identified known phrase. The social-networking system may compute the features from counts in the index of known phrases. The social-networking system may aggregate features for all known phrases in a post, where the aggregated features are used for scoring the post. The aggregated features for the known phrases in each post may be calculated mean values of respective kind of features for the known phrases in the post. The aggregated features for the known phrases in each post may be calculated minimum values of respective kind of features for the known phrases in the post. The aggregated features for the known phrases in each post may be calculated maximum values of respective kind of features for the known phrases in the post. The social-networking system may calculate, for each post in the filtered set of posts, a score for the post based on the plurality of features of the identified known phrases included in the post by applying a pre-determined evaluation model on the features. The social-networking system may rank the posts based on the calculated scores. The social-networking system may send, to the client system in response to the search query, instructions for generating a search-results interface comprising references to one or more of the posts presented in ranked order.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 5A-5D illustrate an example procedure for identifying candidate phrases.

DESCRIPTION OF EXAMPLE EMBODIMENTS

System Overview

Figure 1:
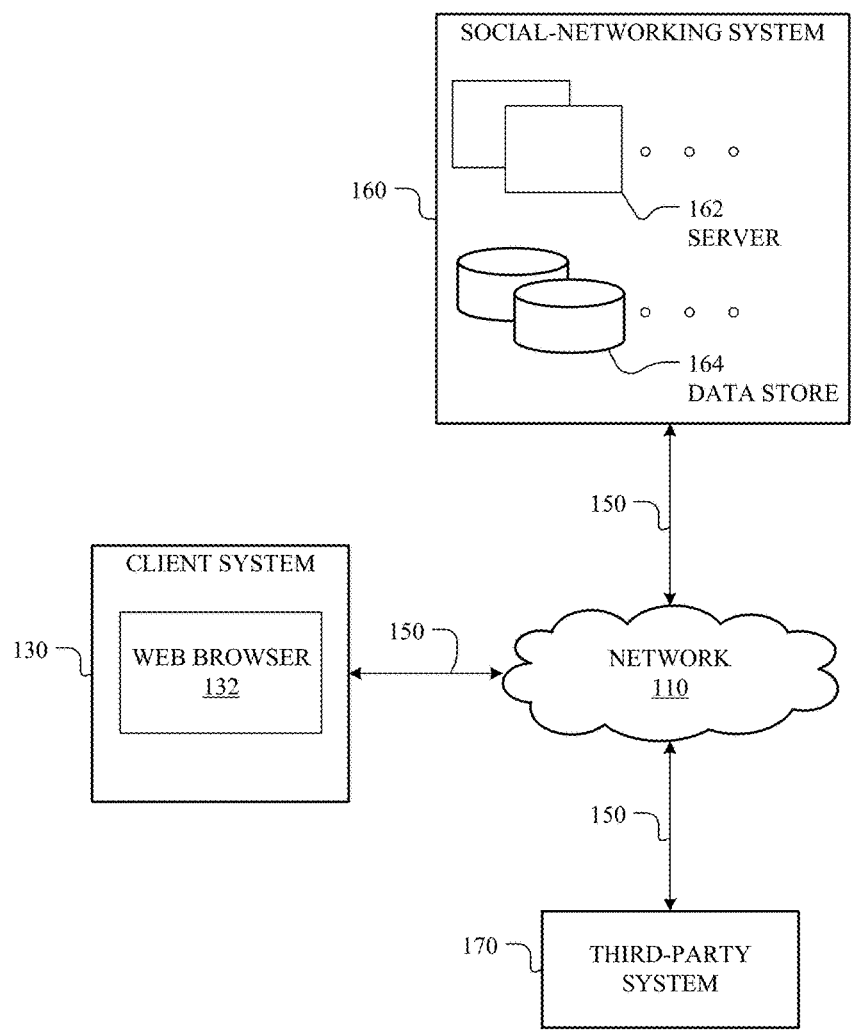
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
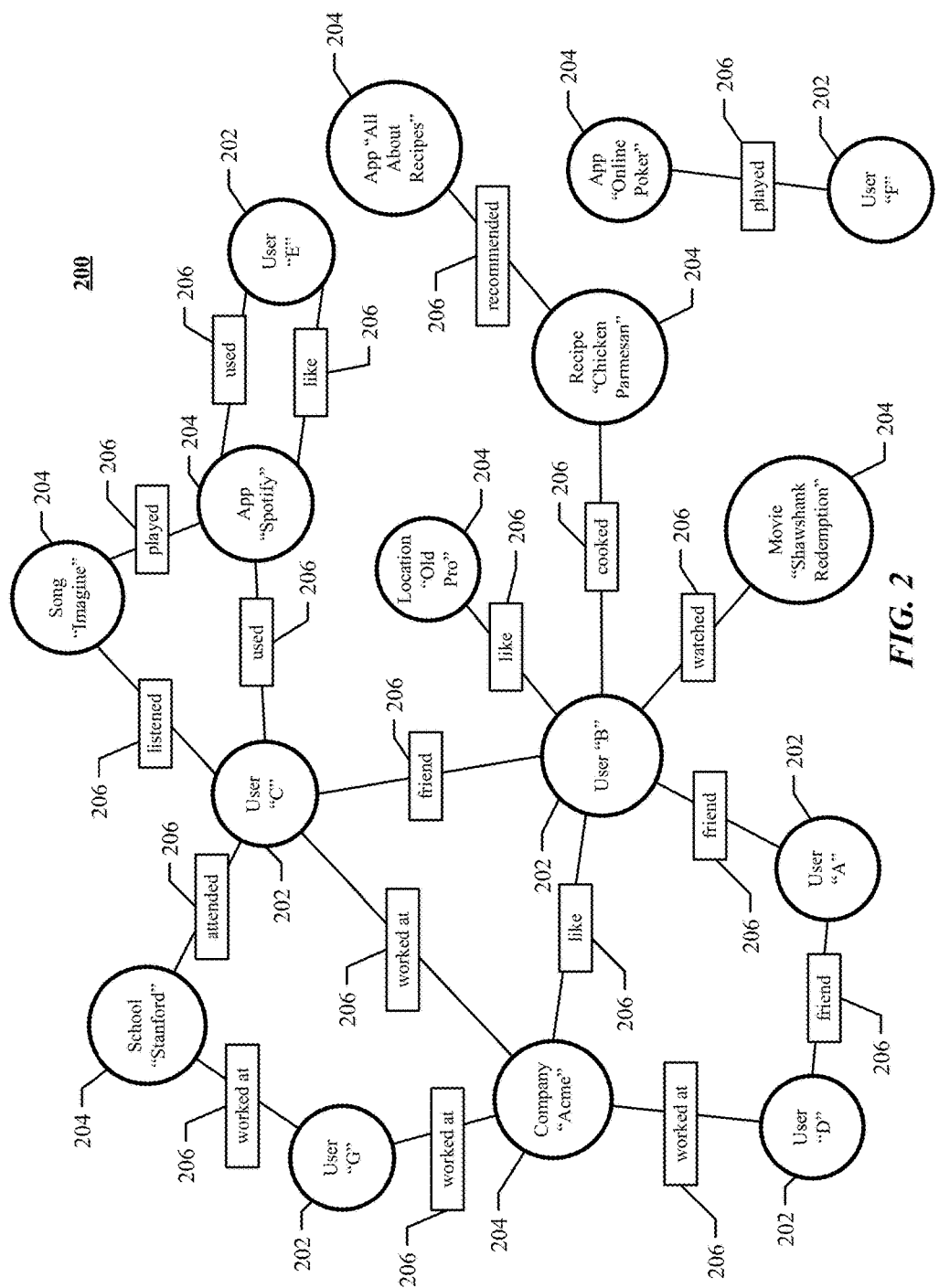
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype.

A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
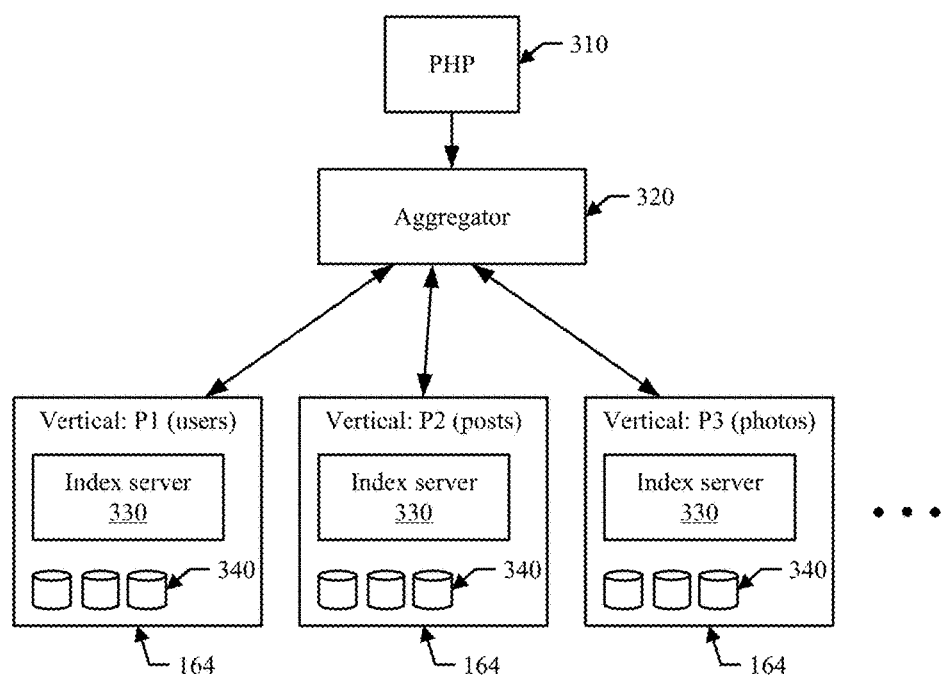
FIG. 3 illustrates an example partitioning for storing objects of a social-networking system.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request. In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Embedding Spaces

Figure 4:
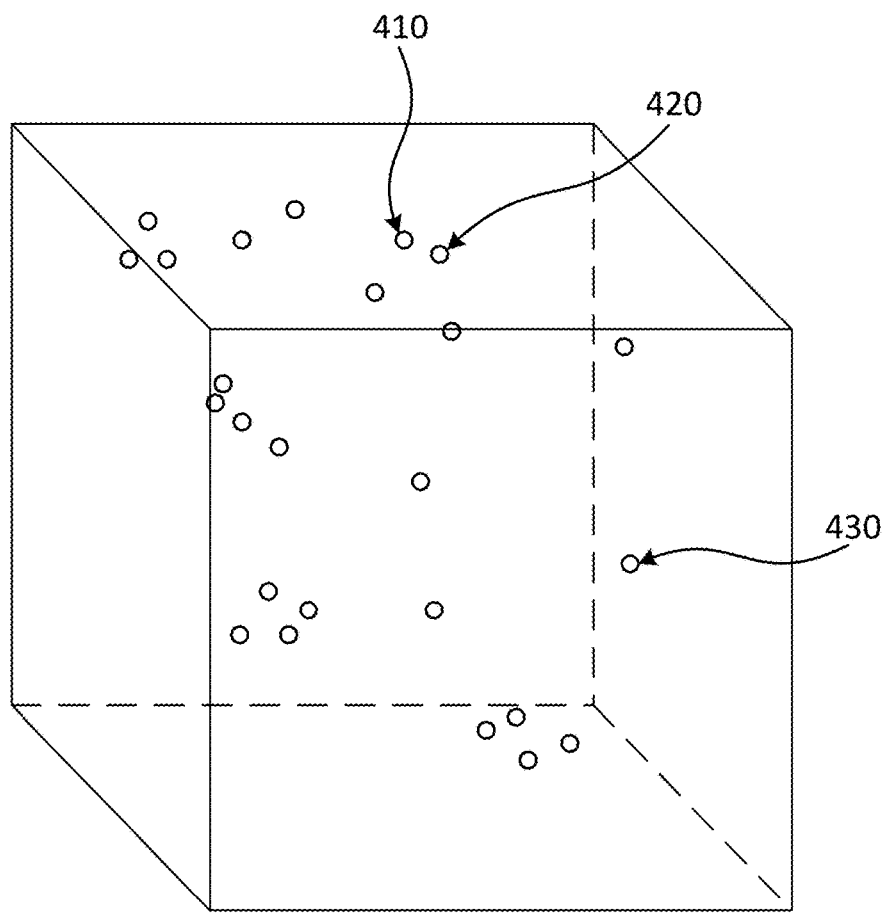
FIG. 4 illustrates an example view of an embedding space.

FIG. 4 illustrates an example view of an embedding space 400. In particular embodiments, n-grams may be represented in a d-dimensional embedding space, where d denotes any suitable number of dimensions. Although the embedding space 400 is illustrated as a three-dimensional space, this is for illustrative purposes only, as the embedding space 400 may be of any suitable dimension. In particular embodiments, an n-gram may be represented in the embedding space 400 as a vector referred to as a term embedding. Each vector may comprise coordinates corresponding to a particular point in the embedding space 400 (i.e., the terminal point of the vector). As an example and not by way of limitation, embeddings 410, 420, and 430 may be represented as points in the embedding space 400, as illustrated in FIG. 4. An n-gram may be mapped to a respective vector representation. As an example and not by way of limitation, n-grams $t_1$ and $t_2$ may be mapped to vectors $\vec{v_1}$ and $\vec{v_2}$ in the embedding space 400, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the embedding space 400. In particular embodiments, an n-gram may be mapped to a vector representation in the embedding space 400 by using a deep-leaning model (e.g., a neural network). The deep-learning model may have been trained using a sequence of training data (e.g., a corpus of objects each comprising n-grams). In particular embodiments, objects may be mapped to an embedding in the embedding space 400. An embedding $\vec{\pi}(e)$ of object e may be based on one or more properties, attributes, or features of the object, relationships of the object with other objects, or any other suitable information associated with the object. As an example and not by way of limitation, an embedding $\vec{\pi}(e)$ of object e may be based on one or more n-grams associated with object e. In particular embodiments, an object may be mapped to a vector representation in the embedding space 400 by using a deep-learning model. In particular embodiments, the social-networking system 160 may utilize one or more systems, components, elements, functions, methods, operations, or steps disclosed in U.S. patent application Ser. No. 14/949,436, filed 23 Nov. 2015, which is incorporated by reference. Although this disclosure describes representing an n-gram or an object in an embedding space in a particular manner, this disclosure contemplates representing an n-gram or an object in an embedding space in any suitable manner.

In particular embodiments, the social-networking system 160 may calculate a similarity metric of embeddings in embedding space 400. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \cdot \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two embeddings may represent how similar the two objects corresponding to the two embeddings, respectively, are to one another, as measured by the distance between the two embeddings in the embedding space 400. As an example and not by way of limitation, embedding 410 and embedding 420 may correspond to objects that are more similar to one another than the objects corresponding to embedding 410 and embedding 430, based on the distance between the respective embeddings.

Measuring Phrase Association

Presenting posts that match the user's interest based on the given query term can be a challenging task for the social-networking system 160. In particular embodiments, the social-networking system 160 may present search results about topics that are more closely associated with the phrases in a user's query by analyzing the phrases in the query and finding topics that have a better statistical likelihood to be equivalent to the topic intended by the querying user, in other words, finding topics with a better degree of equivalence to the phrase in the query. When a user queries with one or more query terms, the social-networking system 160 may retrieve posts containing each of the one or more query terms in the text from the posts vertical. For each retrieved post, the social-networking system 160 may identify one or more phrases containing at least one of the one or more query terms, called candidate phrases. The social-networking system 160 may determine whether each identified candidate phrase is listed in an index of known phrases. When a candidate phrase matches a phrase in the index of known phrases, the candidate phrase may be referred to as an identified known phrase. The social-networking system 160 may filter out the posts that do not have any identified known phrases. Then, the social-networking system 160 may rank the remaining posts based on the degree of equivalence between the query terms and the identified known phrases in each post. The degree of equivalence between the query terms and the identified known phrase can be measured by various features. The social-networking system 160 may present posts having a relatively high rank to the user. As an example and not by way of limitation, Bob, a querying user, may search posts with a query term "Donald." The social-networking system 160 may retrieve posts containing "Donald" in the text. The social-networking system 160 may identify candidate phrases that contain "Donald" and the length of which are two words because the social-networking system 160 may be configured that a pre-determined maximum length of known phrases is 2. The social-networking system 160 may determine whether a candidate phrase is an identified known phrase by looking up the candidate phrase from an index of known phrases. If a candidate phrase matches in the index of known phrases, the phrase may be considered as an identified known phrase. The identified known phrases in this example may include, for example, "Donald Trump," "Donald Glover," and "Donald Duck." The social-networking system 160 may filter out posts that do not have any identified known phrase in the text from the set of retrieved posts. The social-networking system 160 may rank the remaining posts by calculating various features and applying a ranking model to the features. The social-networking system 160 may present posts containing "Donald Trump" first to Bob as the posts containing "Donald Trump" are ranked higher than the other posts. Although this disclosure describes presenting search results based on the degree of equivalence between the phrase in the query and the phrases in the posts in a particular manner, this disclosure contemplates presenting search results based on the degree of equivalence between the phrase in the query and the phrases in the posts in any suitable manner.

In particular embodiments, the social-networking system 160 may use an offline process that analyzes posts and generates an index of known phrases. The index of known phrases may be stored in a phrase table. Each entry in the phrase table may comprise a phrase, the element tokens of the phrase, and their respective counts. The element tokens of a phrase in the phrase table may have a strong association with each other. In other words, when a first element token of a phrase in the phrase table occurs in the text, a second element token of the phrase may have a strong probability to occur together with the first element token. For example, in the entry for "Donald Trump," the token "Donald" has a strong association with the token "Trump." The association may be measured by a Normalized Pointwise Mutual Information (NPMI) method in terms of probability of co-occurrences, though any other suitable feature can be used for measuring the association between element tokens of a phrase. A Pointwise Mutual Information (PMI) score of a pair of outcomes x and y belonging to discrete random variables X and Y quantifies the discrepancy between the probability of their coincidence given their joint distribution and their individual distributions, assuming independence.

Mathmatically, $$PMI(x; y) = \log\frac{p(x, y)}{p(x)p(y)} = \log\frac{p(x|y)}{p(x)} = \log\frac{p(y|x)}{p(y)}.$$

NPMI score is a normalized PMI between [−1, +1], where NPMI score −1 represents that x and y never occurs together while NPMI score +1 represents that x and y co-occur all the time. In particular embodiments, the phrase table may further index topic or entity IDs associated with the phrases. The phrase table may consist of two kinds of counts. The user count for a phrase is the number of unique users that mentioned the phrases in their posts. The post count for a phrase is the number of unique posts that contain the phrase. In particular embodiments, the social-networking system 160 may use the user count for computing features for each identified known phrases. In particular embodiments, the social-networking system 160 may use the post count for computing features for each identified known phrases. In particular embodiments, the social-networking system 160 may generate the phrase table at a regular interval, e.g., daily, weekly, monthly. In particular embodiments, the social-networking system 160 may generate the phrase table with phrases whose length are less than or equal to a pre-determined value. In particular embodiments, the social-networking system 160 may adjust the generation frequency and the maximum phrase length as needed. As an example and not by way of limitation, the social-networking system 160 may generate the phrase table every day with the maximum length of 3. The social-networking system 160 may measure the association between elements in the phrases in the texts of the posts by computing NPMI score for each phrase. The social-networking system 160 may generate the table with phrases whose elements have a strong association. Although this disclosure describes generating a phrase table based on an association between elements of phrases in a particular manner, this disclosure contemplates generating a phrase table based on an association between elements of phrases in any suitable manner.

In particular embodiments, the social-networking system 160 may receive, from a client system 130 of a first user of an online social network, a search query for posts of the online social network. The search query may comprise one or more query terms. A user of an online social network may search for information relating to a specific subject matter (e.g., users, concepts, external content or resource, other suitable subject matter) by providing a short phrase describing the subject matter, often referred to as a "search query," to the social-networking system 160. The client system 130 may access the social-networking system 160 using a web browser 132, or a native application associated with the social-networking system 160 (e.g., a mobile social-networking application, a messaging application, another suitable application, or any combination thereof), either directly, via a network 110, or via a third-party system 170. When the first user enters the search query in the query field and clicks a "search" button or takes an action that has an equivalent effect, the client system 130 may send the search query to the social-networking system 160 using, for example, an HTTP request. As an example and not by way of limitation, Bob, a querying user, may want to search posts covering Donald Trump and may type "Donald" in the query field and click the search button on a web browser on his desktop computer. The client system 130 may send the search query "Donald" to the social-networking system 160. Although this disclosure describes the social-networking system 160 receiving a search query in a particular manner, this disclosure contemplates the social-networking system 160 receiving a search query in any suitable manner.

In particular embodiments, the social-networking system 160 may retrieve a plurality of posts of the online social network. Each of the retrieved posts may contain each of the one or more query terms in a text of the post. In other words, the social-networking system 160 may retrieve posts matching the search query. After receiving a search query from the client system 130, the social-networking system 160 may prepare a set of search results. As the first step, the social-networking system 160 may retrieve posts that contain each of the one or more query terms from one or more data stores 164 of the social-networking system 160. The posts may be stored in any suitable data storage within the social-networking system 160 or outside the social-networking system 160. In particular embodiments, the social-networking system 160 may retrieve posts that contain only part of the one or more query terms from one or more data stores 164 of the social-networking system 160. In other words, the social-networking system 160 may retrieve posts partially matching the search query. As an example and not by way of limitation, the social-networking system 160 may retrieve posts containing "Donald" in the text from the data stores 164 after receiving a search query with a query term "Donald." As another example and not by way of limitation, the social-networking system 160 may retrieve posts containing "Barack" and "Obama" from the data stores 164 when the social-networking system 160 receives a search query with "Barack Obama" as query terms. The retrieved post may not have "Barack Obama" together. "Barack" and "Obama" may appear separately in the text. As another example and not by way of limitation, the social-networking system 160 may retrieve posts containing either "Barack" or "Obama" from the data stores 164 after receiving a search query with query terms "Barack Obama." The retrieved posts may not have both "Barack" and "Obama" in the text. Although this disclosure describes retrieving posts from the data stores 164 after receiving a search query in a particular manner, this disclosure contemplates retrieving posts from the data stores 164 after receiving a search query in any suitable manner.

In particular embodiments, the social-networking system 160 may identify, from an index of known phrases, one or more known phrases in the text of the one or more retrieved posts. Each identified known phrase may contain at least one of the one or more query terms. The index of known phrases may comprise a plurality of pre-identified phrases having a length less than or equal to a pre-determined maximum known phrase length. The index of known phrases may comprises phrases whose elements have a strong association with each other (for example, a strong association as measured by a NPMI method). That at least one of the one or more query terms has a strong association with the other elements in a phrase may indicate that the phrase may have a better degree of equivalence to the at least one of the one or more query terms. The identified one or more known phrases in the text of a post may be used to evaluate the statistical likelihood for the post being equivalent to the topic intended by the querying user. As an example and not by way of limitation, the social-networking system 160 may have retrieved posts containing "Donald" from the data stores 164 after receiving a search query with "Donald" as a query term from a client system 130. The social-networking system 160 may identify known phrases in the text of the retrieved posts. The identified known phrases may include, for example, "Donald Trump," "Donald Glover," and "Donald Duck." Although this disclosure describes identifying known phrases in a particular manner, this disclosure contemplates identifying known phrases in any suitable manner.

In particular embodiments, the social-networking system 160 may identify, in the text of each of the one or more retrieved posts, a plurality of candidate phrases comprising at least one of the one or more query terms and having a length less than or equal to the pre-determined maximum known phrase length. The first step in identifying known phrases in the text may be identifying candidate phrases, where a candidate phrase comprises at least one or more query terms and has a length less than or equal to the pre-determined maximum known phrase length. The social-networking system 160 may later determine whether each identified candidate phrase is a known phrase by looking up the candidate phrase in the index of known phrases. Because known phrases in the index of known phrases have a length less than or equal to the pre-determined maximum known phrase length, a length of an identified candidate phrase may be less than or equal to the pre-determined maximum known phrase length. As an example and not by way of limitation, the social-networking system 160 may be configured that the maximum length of known phrases is 3, in other words, the maximum length of candidate phrases is set to 3. The social-networking system 160 may have received a search query with query term "Donald" and may have retrieved posts containing "Donald" in the text. The social-networking system 160 may encounter a sentence reading "The newspaper reports that Donald Trump will hold a press conference." The social-networking system 160 may identify candidate phrases "that Donald," "Donald Trump," "reports that Donald," "that Donald Trump," and "Donald Trump will" in the sentence. Although this disclosure describes identifying candidate phrases in a particular manner, this disclosure contemplates identifying candidate phrases in any suitable manner.

In particular embodiments, the social-networking system 160 may search, in the text of each retrieved post, any of the one or more query terms. The social-networking system 160 may identify all the phrases in the text that contains any of the one or more query terms and has a length less than or equal to the pre-determined maximum known phrase length. To identify all the candidate phrases in each post, the social-networking system 160 may search any of the query terms in the text of each retrieved post. Once the social-networking system 160 finds any of the one or more query terms, the social-networking system 160 may identify candidate phrases around the found query term. In particular embodiments, the social-networking system 160 may search any of the one or more query terms in the text of each retrieved post in a sequential manner (e.g., from the beginning or the end of the text) or in a non-sequential manner. The social-networking system 160 may apply any suitable search method. As an example and not by way of limitation, continuing with the prior example, the social-networking system 160 may search the text of a post from the beginning and may find "Donald," the query term, from the sentence "The newspaper reports that Donald Trump will hold a press conference." Although this disclosure describes searching any of the query terms in a particular manner, this disclosure contemplates searching any of the query terms in any suitable manner.

In particular embodiments, the social-networking system 160, for each searched query term, may identify around the searched term in the text all phrases containing the searched query term and having a length equal to a target length. The length of a phrase may be measured by the number of element words in the phrase. The target length for a phrase may be from 2 to the pre-determined maximum known phrase length that may be increased by one at each iteration. After finding any of the query terms in the text, the social-networking system 160 may identify candidate phrases around the found query term. The purpose of this procedure may be identifying all the phrases that contain the found query term and have a length less than or equal to the pre-determined maximum known phrase length. The social-networking system 160 may begin the procedure by setting the target length to 2 at the first iteration. The social-networking system 160 may identify phrases having a length equal to the target length and containing the found query term. After identifying all the phrases of the target length and containing the found query term in an iteration, the social-networking system 160 may proceed to the next iteration by increasing the target length by one (e.g., to a target length of 3) and identifying all the phrases having length equal to the target length and containing the found query term, and so on. When identifying phrases, the social-networking system 160 may move on to the next found query term when the target length exceeds the pre-determined maximum known phrase length. The social-networking system 160 may move on to the next retrieved post if no more query terms are found in the text. As an example and not by way of limitation, continuing with the prior example, the social-networking system 160 may be configured that the maximum length of known phrases is 4. After finding a query term "Donald" in a sentence "The newspaper reports that Donald Trump will hold a press conference", the social-networking system 160 may first set the target length to 2. The social-networking system 160 may identify candidate phrases "Donald Trump" and "that Donald" at the first iteration. Then, the social-networking system 160 may increase the target length to 3. The social-networking system 160 may identify candidate phrases "Donald Trump will", "that Donald Trump", and "reports that Donald" at the second iteration. The social-networking system 160 may then increase the target length to 4. The social-networking system 160 may identify candidate phrases "Donald Trump will hold", "that Donald Trump will", "reports that Donald Trump", and "newspaper reports that Donald" at the third iteration. Because increasing the target length makes the target length exceed the configured maximum known phrase length, the social-networking system 160 may move on to the next found query term. An example pseudo code for this procedure is shown below:

FOR each found query term

```
term_position = position of the found query term; // in granularity
of word
FOR each target_len in [2, PRE-DETERMINED MAX] increasing by 1
    FOR each offset in [0, target_len) increasing by 1
        start_position = term_position − offset;
        phrase = a phrase beginning with a word at start_position and
length of target_len;
        Add phrase in the candidate phrase pool;
    END FOR
END FOR
END FOR
```

Although this disclosure describes identifying candidate phrases around a found query term in a particular manner, this disclosure contemplates identifying candidate phrases around a found query term in any suitable manner.

FIGS. 5A-5D illustrate an example procedure for identifying candidate phrases. In the illustrated example, the social-networking system 160 performs a procedure to identify candidate phrases in a post after receiving a search query with "Donald" as the query term. While searching the query term "Donald" in the text, the social-networking system 160 finds the term within a sentence "The newspaper reports that Donald Trump will hold a press conference." Though the social-networking system 160 may find more occurrences of the query term "Donald" in the post, we do not show the other occurrences in this example for brevity. In a first part of the example illustrated in FIG. 5A, the social-networking system 160 finds the query term "Donald" 510 in the text while the social-networking system 160 searches the query term. The position of the query term, in terms of word order from the beginning of the text, may be recorded in a variable, term position. In a second part of the example illustrated in FIG. 5B, the social-networking system 160 may set the target length to two and may find candidate phrases that contain "Donald" the found query term, and have a length equal to two. The social-networking system 160 may set the starting position to term_position and may identify a two-word phrase beginning at the starting position, which is "Donald Trump" 520. The social-networking system 160 may change the starting position to term_position-1 and may identify a two-word phrase from the new starting position, which is "that Donald" 530.

Figure 5C:
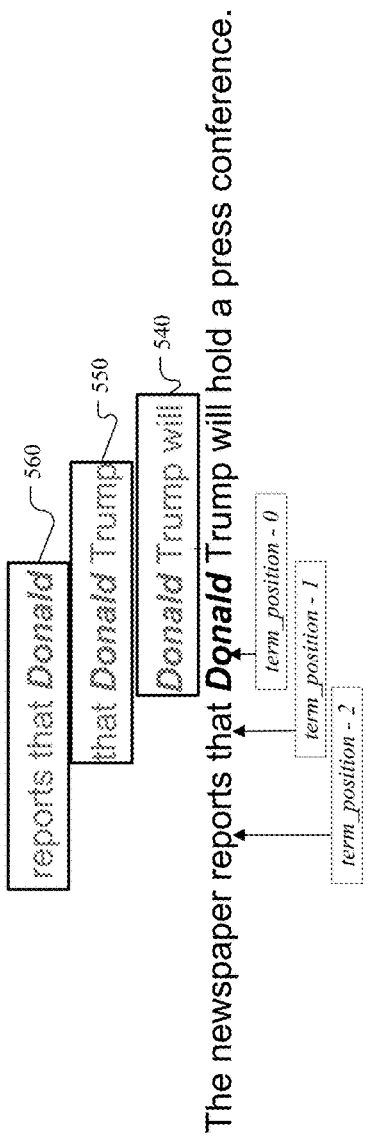

In a third part of the example illustrated in FIG. 5C, the social-networking system 160 performs the next iteration of identifying candidate phrases by setting the target length to three and resetting the starting position to term_position. The social-networking system 160 identifies a three-word phrase beginning at the starting position, which is "Donald Trump will" 540. The social-networking system 160 may adjust the starting position to term_position-1 and may identify a three-word phrase from the adjusted starting position, which is "that Donald Trump" 550. The social-networking system 160 may again adjust the starting position to term_position-2 and may identify another three-word phrase from the new starting position, which is "reports that Donald" 560.

Figure 5D:
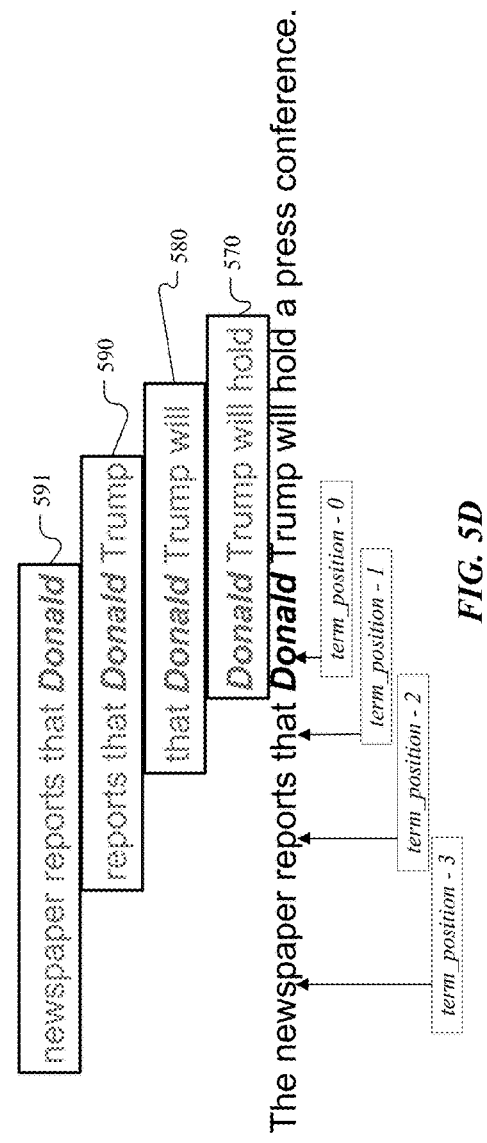

In a fourth part of the example illustrated in FIG. 5D, the social-networking system 160 performs the next iteration of identifying candidate phrases by setting the target length to 4 and resetting the starting position to term_position. Following the procedure mentioned above, the social-networking system 160 identifies four-word candidate phrases: "Donald Trump will hold" 570, "that Donald Trump will" 580, "reports that Donald Trump" 590, and "newspaper reports that Donald" 591. After this point, because increasing the target length would cause the target length exceed the configured maximum known phrase length, the social-networking system 160 may move on to the next found query term in the text (not shown in this example). Although FIGS. 5A-5D illustrate identifying candidate phrases around a found query term in the text in a particular manner, this disclosure contemplates identifying candidate phrases around a found query term in the text in any suitable manner.

In particular embodiments, the social-networking system 160 may determine whether each of the identified candidate phrases matches in the index of known phrases. The social-networking system 160 may look up each identified candidate phrase in the index of known phrases. A candidate phrase that matches in the index of known phrases may be marked as an identified known phrase. As an example and not by way of limitation, continuing with the prior example, the social-networking system 160 may have identified candidate phrases "Donald Trump" 520, "that Donald" 530, "Donald Trump will" 540, "that Donald Trump" 550, "reports that Donald" 560, "Donald Trump will hold" 570, "that Donald Trump will" 580, "reports that Donald Trump" 590, and "newspaper reports that Donald" 591. The social-networking system 160 may identify only "Donald Trump" 520 as an identified known phrase after looking up each identified candidate phrase in the index of known phrases. Although this disclosure describes determining whether a candidate phrase is a known phrase in a particular manner, this disclosure contemplates determining whether a candidate phrase is a known phrase in any suitable manner.

In particular embodiments, each phrase in the index of known phrases may comprise a plurality of element terms. Each element term of a known phrase may have an association greater than a threshold association with respect to each other element term of the known phrase. The association between element terms may be measured with respect to terms extracted from a set of posts associated with the online social network created during a pre-determined period of time (note, however, that the terms may be extracted from any suitable corpus of text). The social-networking system 160 may generate the index of known phrases at a regular interval. The social-networking system 160 may process all the posts created during the pre-determined period of time and may select only phrases whose element terms have a strong association. In particular embodiments, the association may be measured by a Normalized Pointwise Mutual Information (NPMI) score. In particular embodiments, the association may be measured by any other suitable feature. As an example and not by way of limitation, the social-networking system 160 may generate an index of known phrases daily by processing all the post created during the last seven days. The social-networking system 160 may include only phrases having a length less than or equal to the pre-determined maximum known phrase length and having element terms that have NPMI score greater than a threshold in the index of known phrases. The generated index of known phrases may be used for determining whether a candidate phrase is a known phrase until another index of known phrases is generated. Although this disclosure describes generating an index of known phrases in a particular manner, this disclosure contemplates generating an index of known phrases in any suitable manner.

In particular embodiments, the social-networking system 160 may count the occurrences of a phrase and its element terms when the social-networking system 160 is generating the index of known phrases. The number of occurrences of an element may be a number of unique posts that mention the element or a number of unique users that mention the element in their posts. The social-networking system 160 may record the counts in the index of known phrases. In particular embodiments, the index of known phrases may be stored in a phrase table comprising a plurality of entries. Each entry in the phrase table may comprise a phrase, element terms of the phrase, and their respective counts. Each element term in a known phrase may appear as an element of the known phrase or by itself in the posts that are used for generating the index of known phrases. The social-networking system 160 may count the occurrences of the known phrases and the occurrences of each element term and record their respective counts in the index of known phrases. As an example and not by way of limitation, the social-networking system 160 may observe a phrase "New York" in 1000 unique posts and may observe "New", an element term of "New York", in 10000 unique posts and may observe "York" in 1500 unique posts while the social-networking system 160 is generating the index of known phrases. The social-networking system 160 may determine that the phrases "New York" is a known phrase, in other words, the elements terms have a strong association with each other. The social-networking system 160 may record the phrase "New York" and its count, 1000, and its element terms "New" and "York" and their counts, 10000 and 1500 respectively, in the phrase table. Although this disclosure describes recording an index of known phrases in a particular manner, this disclosure contemplates recording an index of known phrases in any suitable manner.

In particular embodiments, the counts may be user counts, each user count for an element being the number of unique users that mentioned the element in their posts. In particular situations, a small number of user may create a large number of posts that contain a particular phrase (e.g., spammers, advertisers, niche content providers). In this situation, the phrase may be overly counted if the social-networking system 160 counts the number of posts that mentioned the phrase. To avoid this problem of over-counting particular phrases, the social-networking system 160 may record a count of user counts when the social-networking system 160 is generating an index of known phrases. A user count for an element is a number of unique users that mentioned the element in their posts. As an example and not by way of limitation, a group of 10 users may have created 5000 posts mentioning "Justin Doe," a new pop singer, to promote a recently released album by Justin Doe. The social-networking system 160 may count the number of unique users that mentioned "Justin Doe," which is 10, when the social-networking system 160 may be generating an index of known phrases. Although this disclosure describes a particular way of counting an element to generate an index of known phrases in a particular manner, this disclosure contemplates any suitable way of counting an element to generate an index of known phrases in any suitable manner.

In particular embodiments, the counts may be post counts, each post count for an element being the number of unique posts that contain the element. In particular situations, post counts may be more suitable than user counts. The social-networking system 160 may count the number of unique posts that contain the element. In particular embodiments, the social-networking system 160 may record both user counts and post counts in the index of known phrases. As an example and not by way of limitation, continuing with the prior example, the social-networking system 160 may also record the number of unique posts, which is 5000, that contain "Justin Doe" in the index of known phrases. The social-networking system 160 may use either user counts or post counts (or both) when the social-networking system 160 may calculate features for each of the identified known phrases. Although this disclosure describes a particular way of counting an element to generate an index of known phrases in a particular manner, this disclosure contemplates any suitable way of counting an element to generate an index of known phrases in any suitable manner.

In particular embodiments, the social-networking system 160 may filter the plurality of retrieved posts to generate a filtered set of posts. The filtering may comprise removing each post not containing at least one of the identified known phrases. In other words, for a particular post retrieved that has one or more terms matching the search query, no known phrase may be identified in a post. If so, then the social-networking system 160 may filter the post out from the filtered set of posts. The social-networking system 160 may compute features for only the posts in the filtered set of posts and may rank only the posts in the filtered set of posts. As an example and not by way of limitation, an online social network user, Mike Jackson, may have recently posted about his grandfather, "Donald Jackson". A querying user, Matthew, may search posts with "Donald" as a query term. The social-networking system 160 may retrieve all the posts containing "Donald" and may identify all the candidate phrases in each retrieved post. No candidate phrase in Mike's post may match in the index of known phrases (i.e., "Donald Jackson" does not appear in the index of known phrases). Therefore, even though Mike's post matches Matthew's query for "Donald," because the post does not contain any phrases matching a known phrase, the social-networking system 160 may filter Mike's post from the filtered set of posts and may not calculate features for the post. Although this disclosure describes filtering posts that do not have any identified known phrase in a particular manner, this disclosure contemplates filtering posts that do not have any identified known phrase in any suitable manner.

In particular embodiments, the social-networking system 160 may compute a plurality of features for each of the identified known phrases. Each feature may measure a degree of equivalence between the identified known phrase and the one or more query terms included in the identified known phrase. The purpose of this procedure may be to identify posts that match the querying user's interest best based on given query terms. When a post contains phrases that have a relatively high degree of equivalence to the query terms, the post may have a better statistical likelihood to match the querying user's interest. The social-networking system 160 may try to measure a degree of equivalence between the identified known phrase and the one or more query terms included in the identified known phrase by computing a plurality of features. An example list of features is provided below. The social-networking system 160 may have identified more than one known phrase in a post. Then, the social-networking system 160 may compute a number of features for each of the identified known phrases. Although this disclosure describes measuring a degree of equivalence between the identified known phrase and the one or more query terms included in the identified known phrase in a particular manner, this disclosure contemplates measuring a degree of equivalence between the identified known phrase and the one or more query terms included in the identified known phrase in any suitable manner.

In particular embodiments, an identified known phrase may be represented by [a, x, b], where x may represent query term element in the identified known phrase, a may represent left neighbor elements, and b may represent right neighbor elements. a and b are referred to as non-query term elements, and either a or b may be empty. In other words, each identified known phrase may comprise query term element and non-query term elements, wherein the query term element comprises one or more query terms in the identified known phrase and the non-query term elements comprise element terms excluding the query term element in the identified known phrase. The features of an identified known phrase [a, x, b] may comprise one or more of:

a log probability of the query term element, log p(x);

a log joint-probability of the non-query term elements, log p(a, b);

a Pointwise Kullback-Leibler divergence score of a probability of the query term element compared to a conditional probability of the query term element given the non-query term elements, $PKL(p(x) \| p(x|a,b))$;

a Pointwise Kullback-Leibler divergence score of a conditional probability of the query term element given the non-query term elements compared to a probability of the query term element, $PKL(p(x|a,b)\|p(x))$;

a Pointwise Jensen-Shannon divergence score of a probability of the query term element compared to a conditional probability of the query term element given the non-query term elements, $PJS(p(x)\|p(x|a,b))$;

a Pointwise Kullback-Leibler divergence score of a joint-probability of the non-query term elements compared to a conditional joint-probability of the non-query term elements given the query term element, $PKL(p(a,b)\|p(a,b|x))$;

a Pointwise Kullback-Leibler divergence score of a conditional joint-probability of the non-query term elements given the query term element compared to a joint-probability of the non-query term elements, $PKL(p(a,b|x)\|p(a,b))$;

a Pointwise Jensen-Shannon divergence score of a joint-probability of the non-query term elements compared to a conditional joint-probability of the non-query term elements given the query term element, $PJS(p(a,b)\|p(a,b|x))$;

a Pointwise Mutual Information score of the non-query term elements and the query term element, $PMI((a,b), x)$;

a Normalized Pointwise Mutual Information of the non-query term elements and the query term element, $NPMI((a,b), x)$; or an Euclidean distance between the word2vec embedding of the query term element from the word2vec embedding of the identified known phrase, $d(embedding(x), embedding(a,x,b))$.

In particular embodiments, the features may be computed from counts in the index of known phrases. The social-networking system 160 may utilize the user counts in the index of known phrases when the social-networking system 160 computes the features for each identified known phrases. The index of known phrases may also contain the total number of unique users who posted in the online social network during the sampling time period used when generating the index of known phrases. Thus, the social-networking system 160 may be able to calculate probabilities of each phrase and its element tokens based on their respective user counts and the total number of user counts. In particular embodiments, the social-networking system 160 may utilize the post counts in the index of known phrases while the social-networking system 160 computes the features for each identified known phrases. The index of known phrases may contain the total number of unique posts that were posted in the online social network during the sampling time period used when generating the index of known phrases. Thus, the social-networking system 160 may be able to calculate probabilities of each phrase and its element tokens based on their respective post counts and the total number of post counts. As an example and not by way of limitation, an index of known phrases may have been generated from a corpus of 100 million posts on the online social network from 10 million users, and a particular known phrase may have been used in 2500 posts by 1000 unique users in those posts. A probability of the known phrase's occurrence based on the user counts in the index of known phrases may be computed to 0.0001, in other words, 0.01%. A probability of the known phrase's occurrence based on the post counts in the index of known phrases may be computed to 0.000025, in other words, 0.0025%. Although this disclosure describes calculating features for identified known phrases in a particular manner, this disclosure contemplates calculating features for identified known phrases in any suitable manner.

In particular embodiments, the social-networking system 160 may aggregate features for all known phrases in a post. The aggregated features may be used for scoring the post with regards to the degree of equivalence between the query terms and the topics covered in the post. The social-networking system 160 may have identified more than one identified known phrase in a post. The social-networking system 160 may then aggregate features for all the known phrases in the post and may use the aggregated features for scoring the post. The aggregated features for the known phrases in each post comprises one or more of:

calculated mean values of the respective kind of features for the known phrases in the post;

calculated minimum values of the respective kind of features for the known phrases in the post; or calculated maximum values of the respective kind of features for the known phrases in the post.

In particular embodiments, an aggregated feature, in other words, the mean, minimum, or maximum value of a kind of features, may be the feature value itself when a post has only one identified known phrase. The social-networking system 160 may use the feature values instead of the aggregated features values for the post when the social-networking system 160 calculates a score for the post. As an example and not by way of limitation, a post in the filtered set of posts may have four identified known phrases. The social-networking system 160 may have computed a number of features for each identified known phrase. The social-networking system 160 may calculate mean, minimum, and maximum values of each kind of features for the four identified known phrases. As another example and not by way of limitation, a post in the filtered set of posts may have only one identified known phrase. The social-networking system 160 may have computed features for the identified known phrase. The mean, minimum, and maximum values of each feature for this post would be the feature value itself. Although this disclosure describes aggregating features in a particular manner, this disclosure contemplates aggregating features in any suitable manner.

In particular embodiments, the social-networking system 160 may calculate, for each post in the filtered set of posts, a score for the post based on the plurality of features of the identified known phrases included in the post. The score may represent the degree of equivalence between the query terms and the topics covered in the post. The social-networking system 160 may have three aggregations, mean, minimum, and maximum, for each feature in a post. In particular embodiments, calculating the score for the post may comprise applying a pre-determined evaluation model on the features. The social-networking system 160 may choose an evaluation model that may produce the optimal results. The evaluation model may be represented by an equation with as many variables as the number of available aggregations. The social-networking system 160 may apply each computed aggregation to the corresponding variable in the evaluation model equation to get a score for a post. As an example and not by way of limitation, a post in the filtered set of posts may have four identified known phrases. The social-networking system 160 may have computed 11 features for each identified known phrase in the post and may have computed aggregations for each feature. The social-networking system 160 may now have 33 aggregation values (3 times 11) for the post. The social-networking system 160 may calculate a score for the post by applying those 11 aggregation values to the corresponding variable in the evaluation model equation. Although this disclosure describes calculating a score for each post in the filtered set of posts in a particular manner, this disclosure contemplates calculating a score for each post in the filtered set of posts in any suitable manner.

In particular embodiments, the social-networking system 160 may rank the posts based on the calculated scores. The social-networking system 160 may sort the posts in the filtered set of posts based on the calculated scores. The order of the posts may be the rank of the posts. As an example and not by way of limitation, the social-networking system 160 may have finished calculating the scores for all the posts in the filtered set of posts. The social-networking system 160 may then rank the posts by sorting the posts with the calculated scores of the posts. The social-networking system 160 may rank a post with the highest score first and may rank another post with the next highest score second, and so on. Although this disclosure describes ranking the posts in a particular manner, this disclosure contemplates ranking the posts in any suitable manner.

In particular embodiments, the social-networking system 160 may send, to the client system 130 in response to the search query, instructions for generating a search-results interface comprising references to one or more of the posts presented in ranked order. The client system 130 may generate a search-results interface and may present the interface to the querying user as a response to the query request. In particular embodiments, the interface may comprise contents of the high-ranking posts and may allow the user to navigate to the lower ranking posts. In particular embodiments, the interface may comprise a list of post titles along with hypertext links to the posts and an interface to allow the user to navigate through the posts. As an example and not by way of limitation, the social-networking system 160 may send an HTTP response with instructions for generating a search-results interface to a client system 130. On receiving the HTTP response from the social-networking system 160, the client system 130 may present a search-results page on the web browser. The interface may comprise references to a number of the high-rank posts. The user may be able to navigate towards the lower ranking posts. Although this disclosure describes sending instructions for generating a search-results interface to the client system 130 in a particular manner, this disclosure contemplates sending instructions for generating a search-results interface to the client system 130 in any suitable manner.

Figure 6:
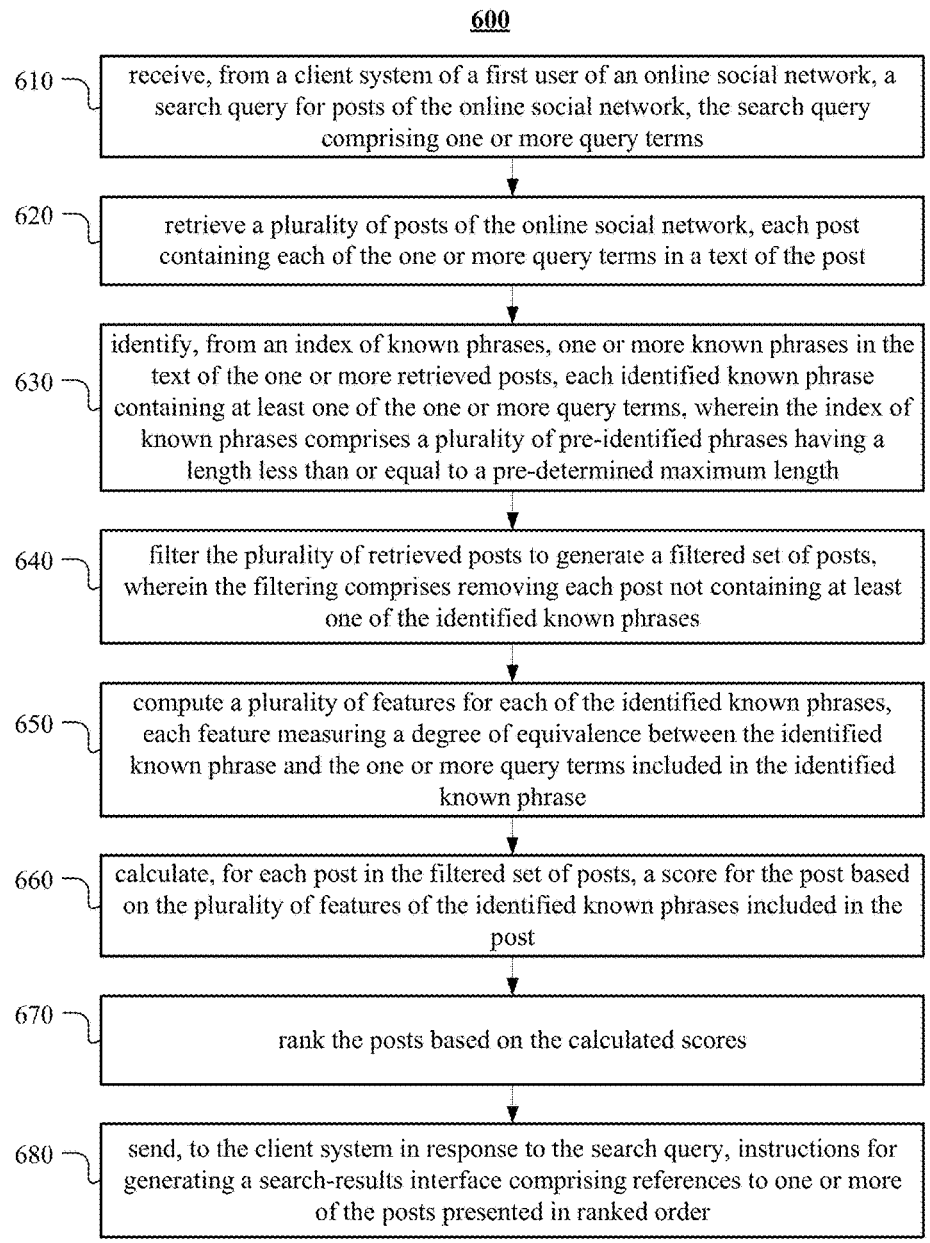
FIG. 6 illustrates an example method 600 for presenting search results by measuring phrase association.

FIG. 6 illustrates an example method 600 for presenting search results by measuring phrase association. The method may begin at step 610, where the social-networking system 160 may receive, from a client system of a first user of an online social network, a search query for posts of the online social network, the search query comprising one or more query terms. At step 620, the social-networking system 160 may retrieve a plurality of posts of the online social network, each post containing each of the one or more query terms in a text of the post. At step 630, the social-networking system 160 may identify, from an index of known phrases, one or more known phrases in the text of the one or more retrieved posts, each identified known phrase containing at least one of the one or more query terms, wherein the index of known phrases comprises a plurality of pre-identified phrases having a length less than or equal to a pre-determined maximum known phrase length. At step 640, the social-networking system 160 may filter the plurality of retrieved posts to generate a filtered set of posts, wherein the filtering comprises removing each post not containing at least one of the identified known phrases. At step 650, the social-networking system 160 may compute a plurality of features for each of the identified known phrases, each feature measuring a degree of equivalence between the identified known phrase and the one or more query terms included in the identified known phrase. At step 660, the social-networking system 160 may calculate, for each post in the filtered set of posts, a score for the post based on the plurality of features of the identified known phrases included in the post. At step 670, the social-networking system 160 may rank the posts based on the calculated scores. At step 680, the social-networking system 160 may send, to the client system in response to the search query, instructions for generating a search-results interface comprising references to one or more of the posts presented in ranked order. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for presenting search results by measuring phrase association including the particular steps of the method of FIG. 6, this disclosure contemplates any suitable method for presenting search results by measuring phrase association including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
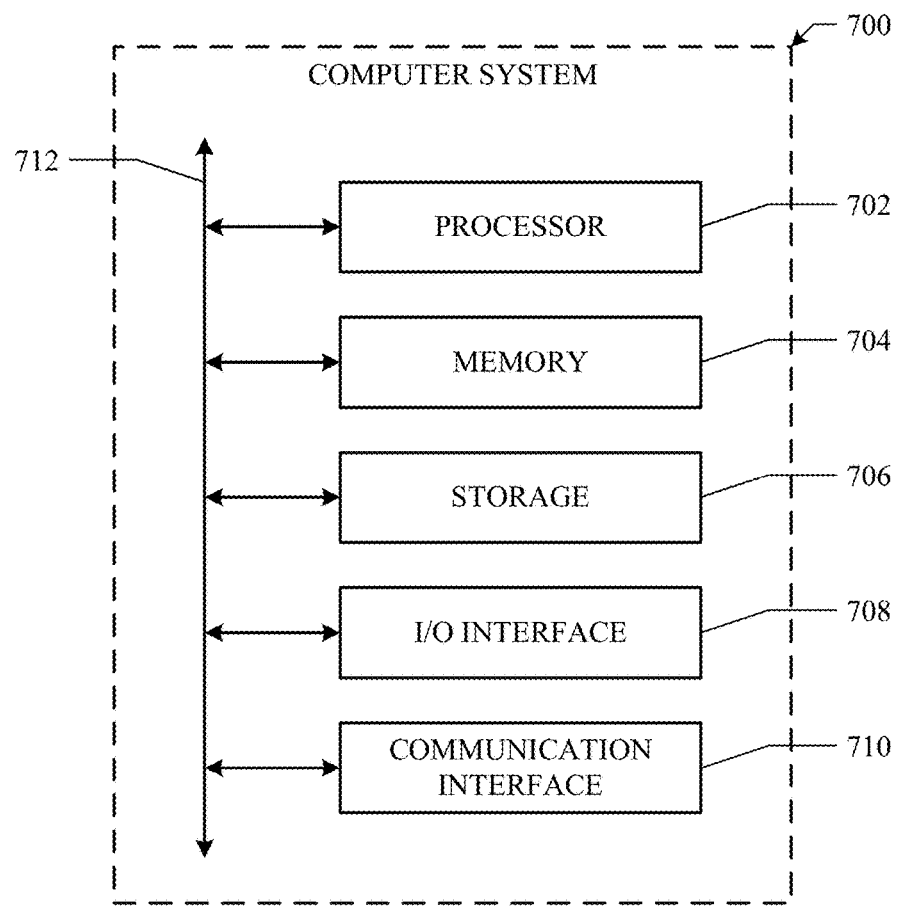
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:

receiving, from a client system of a first user of an online social network, a search query for posts of the online social network, the search query comprising one or more query terms;

retrieving a plurality of posts of the online social network, each post containing each of the one or more query terms in a text of the post;

identifying, from an index of known phrases, one or more known phrases in the text of the one or more retrieved posts, each identified known phrase containing at least one of the one or more query terms, wherein the index of known phrases comprises a plurality of pre-identified phrases having a length less than or equal to a pre-determined maximum length;

filtering the plurality of retrieved posts to generate a filtered set of posts, wherein the filtering comprises removing each post not containing at least one of the identified known phrases;

computing a plurality of features for each of the identified known phrases, each feature measuring a degree of equivalence between the identified known phrase and the one or more query terms included in the identified known phrase;

calculating, for each post in the filtered set of posts, a score for the post based on the plurality of features of the identified known phrases included in the post;

ranking the posts based on the calculated scores; and sending, to the client system in response to the search query, instructions for generating a search-results interface comprising references to one or more of the posts presented in ranked order.

2. The method of claim 1, wherein identifying one or more known phrases comprises:

identifying, in the text of each of the one or more retrieved posts, a plurality of candidate phrases comprising at least one of the one or more query terms and having a length less than or equal to the pre-determined maximum length; and determining whether each of the identified candidate phrases matches in the index of known phrases.

3. The method of claim 2, wherein identifying the plurality of candidate phrases comprises:

searching, in the text of each retrieved post, any of the one or more query terms; and for each searched query term:
for a target length from 2 to the pre-determined maximum length being increased by one at each iteration:
identifying, around the searched term in the text, all phrases containing the searched query term and having a length equal to the target length.

4. The method of claim 1, wherein each phrase in the index of known phrases comprises a plurality of element terms, each element term of a phrase having an association greater than a threshold with respect to each other element term of the phrase, and wherein the association is measured with respect to terms extracted from a set of posts associated with the online social network posts created during a pre-determined period of time.

5. The method of claim 4, wherein the association is measured by a Normalized Pointwise Mutual Information (NPMI) score.

6. The method of claim 1, wherein the index of known phrases is stored in a phrase table comprising a plurality of entries, each entry in the phrase table comprising a phrase, element terms of the phrase, and their respective counts.

7. The method of claim 6, wherein the counts are user counts, each user count for an element being the number of unique users that mentioned the element in their posts.

8. The method of claim 6, wherein the counts are post counts, each post count for an element being the number of unique posts that contain the element.

9. The method of claim 1, further comprising aggregating features for all known phrases in a post, wherein the aggregated features are used for scoring the post.

10. The method of claim 9, wherein the aggregated features for the known phrases in each post comprises one or more of:

calculated mean values of respective kind of features for the known phrases in the post;

calculated minimum values of respective kind of features for the known phrases in the post; or calculated maximum values of respective kind of features for the known phrases in the post.

11. The method of claim 1, wherein the features are computed from counts in the index of known phrases.

12. The method of claim 1, wherein calculating the score for the post comprises applying a pre-determined evaluation model on the features.

13. The method of claim 1, wherein each identified known phrase comprises query term element and non-query term elements, wherein the query term element comprises one or more query terms in the identified known phrase and the non-query term elements comprise element terms excluding the query term element in the identified known phrase, wherein the features comprise one or more of:

a log probability of the query term element;

a log joint-probability of the non-query term elements;

a Pointwise Kullback-Leibler divergence score of a probability of the query term element compared to a conditional probability of the query term element given the non-query term elements;

a Pointwise Kullback-Leibler divergence score of a conditional probability of the query term element given the non-query term elements compared to a probability of the query term element;

a Pointwise Jensen-Shannon divergence score of a probability of the query term element compared to a conditional probability of the query term element given the non-query term elements;

a Pointwise Kullback-Leibler divergence score of a joint-probability of the non-query term elements compared to a conditional joint-probability of the non-query term elements given the query term element;

a Pointwise Kullback-Leibler divergence score of a conditional joint-probability of the non-query term elements given the query term element compared to a joint-probability of the non-query term elements;

a Pointwise Jensen-Shannon divergence score of a joint-probability of the non-query term elements compared to a conditional joint-probability of the non-query term elements given the query term element;

a Pointwise Mutual Information score of the non-query term elements and the query term element;

a Normalized Pointwise Mutual Information of the non-query term elements and the query term element; or an Euclidean distance between the word2vec embedding of the query term element from the word2vec embedding of the identified known phrase.

14. One or more computer-readable non-transitory storage media embodying software that is operable when executed to:

receive, from a client system of a first user of an online social network, a search query for posts of the online social network, the search query comprising one or more query terms;

retrieve a plurality of posts of the online social network, each post containing each of the one or more query terms in a text of the post;

identify, from an index of known phrases, one or more known phrases in the text of the one or more retrieved posts, each identified known phrase containing at least one of the one or more query terms, wherein the index of known phrases comprises a plurality of pre-identified phrases having a length less than or equal to a pre-determined maximum length;

filter the plurality of retrieved posts to generate a filtered set of posts, wherein the filtering comprises removing each post not containing at least one of the identified known phrases;

compute a plurality of features for each of the identified known phrases, each feature measuring a degree of equivalence between the identified known phrase and the one or more query terms included in the identified known phrase;

calculate, for each post in the filtered set of posts, a score for the post based on the plurality of features of the identified known phrases included in the post;

rank the posts based on the calculated scores; and send, to the client system in response to the search query, instructions for generating a search-results interface comprising references to one or more of the posts presented in ranked order.

15. The media of claim 14, wherein identifying one or more known phrases comprises:

identifying, in the text of each of the one or more retrieved posts, a plurality of candidate phrases comprising at least one of the one or more query terms and having a length less than or equal to the pre-determined maximum length; and determining whether each of the identified candidate phrases matches in the index of known phrases.

16. The media of claim 14, wherein identifying the plurality of candidate phrases comprises:

searching, in the text of each retrieved post, any of the one or more query terms; and for each searched query term:
for a target length from 2 to the pre-determined maximum length being increased by one at each iteration:
identifying, around the searched term in the text, all phrases containing the searched query term and having a length equal to the target length.

17. The media of claim 14, wherein each phrase in the index of known phrases comprises a plurality of element terms, each element term of a phrase having an association greater than a threshold with respect to each other element term of the phrase, and wherein the association is measured with respect to terms extracted from a set of posts associated with the online social network posts created during a pre-determined period of time.

18. The media of claim 14, wherein the association is measured by a Normalized Pointwise Mutual Information (NPMI) score.

19. The media of claim 14, wherein the index of known phrases is stored in a phrase table comprising a plurality of entries, each entry in the phrase table comprising a phrase, element terms of the phrase, and their respective counts.

20. A system comprising: one or more processors; and a non-transitory memory coupled to the processors comprising instructions executable by the processors, the processors operable when executing the instructions to:

receive, from a client system of a first user of an online social network, a search query for posts of the online social network, the search query comprising one or more query terms;

retrieve a plurality of posts of the online social network, each post containing each of the one or more query terms in a text of the post;

identify, from an index of known phrases, one or more known phrases in the text of the one or more retrieved posts, each identified known phrase containing at least one of the one or more query terms, wherein the index of known phrases comprises a plurality of pre-identified phrases having a length less than or equal to a pre-determined maximum length;

filter the plurality of retrieved posts to generate a filtered set of posts, wherein the filtering comprises removing each post not containing at least one of the identified known phrases;

compute a plurality of features for each of the identified known phrases, each feature measuring a degree of equivalence between the identified known phrase and the one or more query terms included in the identified known phrase;

calculate, for each post in the filtered set of posts, a score for the post based on the plurality of features of the identified known phrases included in the post;

rank the posts based on the calculated scores; and send, to the client system in response to the search query, instructions for generating a search-results interface comprising references to one or more of the posts presented in ranked order.

\* \* \* \* \*